(12) United States Patent
Ruehle (10) Patent No.: US 9,268,570 B2
(45) Date of Patent: Feb. 23, 2016

(54) DFA COMPRESSION AND EXECUTION

(71) Applicant: Intel Corporation, Santa Clara, CA (US)

(72) Inventor: Michael Ruehle, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 13/747,538

(22) Filed: Jan. 23, 2013

(65) Prior Publication Data

US 2014/0208076 A1     Jul. 24, 2014

(51) Int. Cl.
| | |
|---|---|
| *G06F 15/18* | (2006.01) |
| *G06F 9/30* | (2006.01) |
| *G06N 99/00* | (2010.01) |
| *G06N 5/02* | (2006.01) |
| *G06N 7/00* | (2006.01) |

(52) U.S. Cl.
CPC ............ *G06F 9/30079* (2013.01); *G06N 5/025* (2013.01); *G06N 7/005* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 5,485,620 A | | 1/1996 | Sadre |
| 5,870,576 A | * | 2/1999 | Faraboschi et al. ............ 712/210 |
| 5,937,181 A | | 8/1999 | Godefroid |
| 6,122,757 A | * | 9/2000 | Kelley ............................ 714/39 |
| 6,697,276 B1 | | 2/2004 | Pereira |
| 6,700,809 B1 | | 3/2004 | Ng |
| 6,934,796 B1 | | 8/2005 | Pereira |
| 7,119,577 B2 | | 10/2006 | Sharangpani |
| 7,382,637 B1 | | 6/2008 | Rathnavelu |
| 7,539,032 B2 | | 5/2009 | Ichiriu |
| 7,710,988 B1 | | 5/2010 | Tripathi |
| 7,805,392 B1 | | 9/2010 | Steele |
| 7,899,904 B2 | | 3/2011 | Ruehle |
| 7,945,528 B2 | | 5/2011 | Cytron |
| 8,024,802 B1 | | 9/2011 | Preston |
| 8,051,085 B1 | | 11/2011 | Srinivasan |
| 8,347,384 B1 | | 1/2013 | Preston |

(Continued)

OTHER PUBLICATIONS

Morita, et al. (Apr. 1994). Parallel generation and parsing of array languages using reversible cellular automata. International Journal of Pattern Recognition and Artificial Intelligence, 8(02), 543-561.

(Continued)

*Primary Examiner* — Kakali Chaki
*Assistant Examiner* — Ababacar Seck
(74) *Attorney, Agent, or Firm* — Barnes & Thornburg LLP (57) ABSTRACT

A character class (CCL) memory containing simple CCLs represented by encoding contained symbols or minimum and maximum symbols of a range, complex CCLs represented by bit-masks indicating contained symbols, and equivalence class (EC) maps represented as tables of ED values for each symbol value. Determining a next DFA transition by comparing multiple CCLs with a single input symbol, and selecting a transition according to the first matching CCL, or selecting a transition corresponding to a vector of CCL match result bits. Comparing CCLs from one DFA instruction to determine a transition and if no CCLs match, comparing CCLs from a second DDFA instruction to determine the transition. Matching linear sequence of two or more DFA states using a sequence of multiple CCLs encoded in a single DFA instruction.

20 Claims, 3 Drawing Sheets

(56) References Cited

U.S. PATENT DOCUMENTS

| | | | |
|---|---|---|---|
| 8,448,249 B1 | 5/2013 | Preston | |
| 8,516,456 B1 | 8/2013 | Starovoitov | |
| 8,572,106 B1* | 10/2013 | Estan | 707/758 |
| 8,862,603 B1 | 10/2014 | Watson | |
| 8,964,548 B1 | 2/2015 | Keralapura | |
| 2001/0014936 A1 | 8/2001 | Jinzaki | |
| 2002/0124162 A1 | 9/2002 | Yung | |
| 2003/0051043 A1 | 3/2003 | Wyschogrod | |
| 2003/0065800 A1 | 4/2003 | Wyschogrod | |
| 2004/0162826 A1 | 8/2004 | Wyschogrod | |
| 2004/0215593 A1 | 10/2004 | Sharangpani | |
| 2005/0012521 A1 | 1/2005 | Sharangpani | |
| 2005/0198625 A1* | 9/2005 | Shi et al. | 717/153 |
| 2005/0273450 A1* | 12/2005 | McMillen et al. | 707/1 |
| 2006/0101195 A1 | 5/2006 | Jain | |
| 2006/0136570 A1 | 6/2006 | Pandya | |
| 2006/0277534 A1 | 12/2006 | Kasuya | |
| 2007/0130140 A1 | 6/2007 | Cytron | |
| 2007/0182540 A1 | 8/2007 | Marman | |
| 2008/0034427 A1 | 2/2008 | Cadambi | |
| 2008/0046423 A1 | 2/2008 | Khan Alicherry | |
| 2008/0059464 A1 | 3/2008 | Law | |
| 2008/0071780 A1 | 3/2008 | Ichiriu | |
| 2008/0109431 A1 | 5/2008 | Kori | |
| 2008/0140600 A1 | 6/2008 | Pandya | |
| 2008/0270342 A1 | 10/2008 | Ruehle | |
| 2008/0271141 A1 | 10/2008 | Goldman | |
| 2009/0063825 A1 | 3/2009 | McMillen | |
| 2009/0119399 A1 | 5/2009 | Hussain | |
| 2009/0177669 A1 | 7/2009 | Ramarao | |
| 2009/0327252 A1 | 12/2009 | Zhang | |
| 2010/0095367 A1 | 4/2010 | Narayanaswamy | |
| 2010/0191958 A1 | 7/2010 | Chen | |
| 2010/0192225 A1 | 7/2010 | Ma | |
| 2010/0198850 A1 | 8/2010 | Cytron | |
| 2010/0229238 A1 | 9/2010 | Ma | |
| 2010/0232447 A1 | 9/2010 | Jing | |
| 2011/0022617 A1 | 1/2011 | Yamagaki | |
| 2011/0093496 A1 | 4/2011 | Bando | |
| 2011/0145181 A1 | 6/2011 | Pandya | |
| 2011/0196971 A1 | 8/2011 | Reguraman | |
| 2011/0219208 A1 | 9/2011 | Asaad | |
| 2011/0258210 A1 | 10/2011 | Agarwal | |
| 2011/0307433 A1 | 12/2011 | Dlugosch | |
| 2012/0011094 A1 | 1/2012 | Yamagaki | |
| 2012/0330868 A1 | 12/2012 | Tago | |
| 2012/0331554 A1 | 12/2012 | Goyal | |
| 2013/0046954 A1 | 2/2013 | Ruehle | |
| 2013/0073503 A1 | 3/2013 | Nagao | |
| 2013/0111503 A1 | 5/2013 | Tago | |
| 2014/0040261 A1 | 2/2014 | Horne | |
| 2014/0101185 A1 | 4/2014 | Ruehle | |
| 2014/0114996 A1 | 4/2014 | Ruehle | |
| 2014/0115263 A1 | 4/2014 | Ruehle | |
| 2014/0143195 A1 | 5/2014 | Ruehle | |
| 2014/0173603 A1 | 6/2014 | Ruehle | |
| 2014/0208076 A1 | 7/2014 | Ruehle | |
| 2014/0229926 A1 | 8/2014 | Xu | |

OTHER PUBLICATIONS

Suejb Memeti, "Automatic Java Code Generator for Regular Expression and Finite Automata", published by Linneaeus Univeristy, Vaxjo, SE, for Degree Project, May 2012, pp. 1-47.

Michela Becchi, Charlie Wiseman, Patrick Crowley, "Evaluating Regular Expression Matching Engines on Network and General Purpose Processors", 5th ACM/IEEE Symposium on Architectures for Networking and Communications Systems (ANCS'09), Oct. 2009, pp. 30-39.

Michela Becchi, Mark Franklin, and Patrick Crowley, "A Workload for Evaluating Deep Packet Inspection Architectures", Workload Characterization, 2008. IISWC 2008. IEEE International Symposium on, Oct. 2008, pp. 79-89.

Michela Becchi, Patrick Crowley, "A Hybrid Finite Automaton for Practical Deep Packet Inspection", CoNEXT '07 Proceedings of the 2007 ACM CoNEXT conference, Dec. 2007, pp. 1-12.

* cited by examiner

REGULAR
EXPRESSION:  /[abcd]*[abef][aceg]h/     ← 110

NFA:    ← 120

DFA:    ← 130

| Hex Range | Description | Notes | Regex |
|---|---|---|---|
| 000-0FF | literal byte | single symbol for Venn | [a] |
| 100-1FF | simple class | index k = N[7:0], CCL addr A=1*k | [S(k)] |
| 200 | disabled | never matches | (?!) |
| 201-21A | caseless | case insensitive letter A to Z | [aA] |
| 21B | EOL | newline (possibly CR or LF) or EOS | $ |
| 21C | Word | word character | \w |
| 21D | Non-Word | non-word or EOS | \W\|\z |
| 21E | EOP | end of packet or EOS | \y |
| 21F | EOS | end of stream (single symbol for Venn) | \z |
| 220-2FF | full mask | index k = N[7:0], CCL addr A=8*k | [M(k)] |
| 300-3FF | half mask | index k = N[7:0], CCL addr A=4*k (matches [\x80-\xff] if k < halfMaskAsciiStart) | [H(k)] |
| 220-3FF | full mask | index k = N[8:0], CCL addr A=8*k (if disableHalfMasks = 1) | [M(k)] |

330 Range
340 3 Chars
350 4 ASCII
360

| | 31 30 | 24 | 23 22 | 16 | 15 14 | 8 | 7 | 6 | 5 | 4 | 3 2 | 1 | 0 |
|---|---|---|---|---|---|---|---|---|---|---|---|---|---|
| Range | C (extra) | | B (max) | | A (min) | | NE | CL | WS | AN | | 0 | 0 |
| 3 Chars | C | | B | | A | | NE | CL | WS | | | 1 | 0 |
| 4 ASCII | D6 | C[6:0] | D5 | B[6:0] | D4 | A[6:0] | NE | CL | D[3:0] | | | 1 | 1 |

Fig. 3B

DFA COMPRESSION AND EXECUTION

BACKGROUND OF THE INVENTION

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example. Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols. Instructions in other languages may be included with these standards, such as Java and Visual Basic. There are numerous instances when information may be interpreted to make routing decisions. It is common for protocols to be organized in a matter resulting in protocol specific headers and unrestricted payloads. Subdivision of the packet information into packets and providing each packet with a header. This enables the routing information to be at a fixed location thus making it easy for routing hardware to find and interpret the information. With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature.

SUMMARY OF THE INVENTION

An embodiment of the invention may therefore comprise a method of character class encoding and DFA execution in a DFA engine wherein an instruction execute pipeline in the DFA engine comprises at least one CCL memory, the method comprising storing a plurality of character classes in the at least one character class memory, representing the plurality of character classes with a plurality of character class codes, extracting at least one character class code from an instruction, accessing the at least one character class memory to retrieve at least one accessed character class that corresponds to the at least one character class code, comparing a current input symbol with the at least one accessed character class, and executing the instruction to determine a transition to a next state.

An embodiment of the invention may further comprise a system for character class encoding and DFA execution in a DFA engine, comprising a compiler enabled to encode ruleset instructions with character class codes, and an instruction execute pipeline, the pipeline comprising at least one CCL memory, wherein the pipeline is enabled to extract the character class codes from the instructions and access a corresponding character class from the at least one CCL memory, and compare the accessed character class with an input symbol to determine if the input symbol is a member of the character class represented by the character class code and to execute a DFA transition based on the determination of character class representation.

An embodiment of the invention may further comprise a system for character class encoding and DFA execution in a DFA engine, comprising a compiler enabled to encode ruleset instructions with character class codes, and an instruction execute pipeline, the pipeline comprising at least one CCL memory, wherein at least one equivalence class map is stored in the at least one CCL memory and the pipeline is enabled to access a word of the equivalence class map, the word being determined by an equivalence class map reference in an instruction and an input symbol.

DETAILED DESCRIPTION OF THE EMBODIMENTS

The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

Performing lexical analysis or pattern matching is generally a computationally expensive step. This is because every symbol of information needs to be examined and dispositioned.

Regular expressions are well known in the prior art and are used for pattern matching and lexical analysis. Regular expressions provides a concise and flexible means for "matching" strings of text, such as particular characters, words, or patterns of characters. Abbreviations for "regular expression" include "regex" and regexp" and these abbreviations may be used throughout this specification interchangeably with each other and with the term "regular expression". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings Examples of specifications that could be expressed in a regular expression are as follows:
  the sequence of characters "car" appearing consecutively in any context, such as in "car", "cartoon", or "bicarbonate"
  the sequence of characters "car" occurring in that order with other characters between them, such as in "Icelander" or "chandler"
  the word "car" when it appears as an isolated word
  the word "car when preceded by the word "blue" or "red"
  the word "car" when not preceded by the word "motor"
  a dollar sign immediately followed by one or more digits, and then optionally a period and exactly two more digits (for example, "$100" or "$245.98").
These sequences are simple and are intended only for purposes of example. Specifications of great complexity are conveyable by regular expressions.

Regular expressions are used by many text editors, utilities, and programming languages to search and manipulate text based on patterns. Some of these languages, including Perl, Ruby, AWK, and Tcl and may integrate regular expressions into the syntax of the core language itself Other programming languages like .NET languages, Java, and Python provide regular expressions through standard libraries.

To find matches to regular expressions or similar pattern matching rules within a symbol stream, two main types of state machines may be constructed, nondeterministic and deterministic finite automata (NFAs and DFAs). Abstractly, an NFA or DFA is a directed graph, in which each graph vertex is a state and each graph edge is labeled with a class of input symbols that it accepts. These edges represent a transition from a source state to a destination state on that symbol class. The main difference between NFAs and DFAs in that any two out-transitions from a DFA state must have non-intersecting symbol classes. However, a single NFA state may have multiple out-transitions labeled with classes containing the same symbol.

Executing a DFA to find rule matches in a symbol stream involves making a traversal or descent of the DFA graph while examining and consuming consecutive symbols of the input stream. The descent begins in a root state and a first symbol is examined to determine which transition from the root state, if any, has a symbol class containing that first symbol. If a transition is found matching the first symbol, the symbol is consumed, and the descent moves to the destination state of the matching transition. In that state, the next input symbol is examined and consumed to make a matching transition to a further next state. This continues until no transition matches and the DFA descent terminates. During the descent, accepting states may be visited, which indicate that one or more rules have been matched. Each match typically begins with the first symbol consumed and ends with the most recent symbol consumed. Such rule matches may be reported such as by outputting a token comprising a rule ID and the start and end positions of the match. A hardware DFA engine may be implemented to perform such DFA descents by accessing a DFA representation stored in a memory.

When a moderately large or complex set of rules is required to be matched in a DFA, a DFA constructed to match the required rules will likewise be quite large. In this context, DFA construction may result in "state explosion". "State explosion" occurs when the complexities of various rules interact in many combinations and results in a number of DFA states being constructed which is much larger than the number of symbols in the ruleset. DFA size can be an exponential function of the ruleset size in some instances. In some cases of state explosion, a useful ruleset may compile into thousands, millions, or billions of states—or more. The large numbers of states resulting from state explosion tend to be complex states which have several transitions on symbol classes of various sizes.

The states and transitions of a DFA may be represented in instructions, where one or more instructions encode the transitions from each DFA state. This may be done in many ways. A baseline "uncompressed" method is to encode each DFA state as a block of instructions, one per possible symbol value, where each instruction indicates the next state to enter if the corresponding symbol is the next input symbol, as well as other information such as rules matched in an accepting state. In a common situation, where the symbol alphabet is the set of 256 byte values from 0x00 to 0xFF, uncompressed DFA encoding requires 256 instructions per state. A moderately large DFA such as 200,000 states would encode into over 50 million instructions. This would consume 200 MB of space, assuming a simple set of 4-byte instructions. Such large DFA instruction image is much larger than typical instruction caches. Hardware DFA engines generally have instruction caches such as 64 KB or less. Uncompressed instruction images hundreds or thousands of times larger can lose a substantial portion of their peak performance due to frequent cache misses.

DFAs may be given compressed instruction encoding in various ways. For example, byte-symbol DFA states may be written into text representations of transition symbol classes and destination states, such as "{[a-f]→123456,[g]→54321}". This may be reasonably compact, such as a few dozen bytes per state, compared with 1024 bytes per state for uncompressed transition tables. Similarly, software representations of DFAs as linked data structures can be encoded directly into binary with average state size below 100 bytes. Compression methods, such as the examples given, are often difficult to decode and executed in the context of performing DFA descents to scan input streams.

Several methods of DFA compression are simple and fast to decode and execute. U.S. Patent Publ. No. 2005/0273450 (Ser. No. 10/851,482), to McMillen et al., herein incorporated in its entirety, describes an instruction format where 1 or 2 symbol values may be encoded in the instruction along with a base address of a destination state block of instructions. Execution involves comparing the encoded symbol values with the next input symbol and accessing a next instruction whose address is determined by adding the base address to an index of the first matching symbol, e.g. base address +1 if the first encoded symbol matches, +2 if the second symbol matches, or +0 if neither matches. This may be extended to N symbol values encoded in an instruction, where N may be determined by the amount of space in each instruction to encode symbol values, e.g. N=3 or N=4 may be practical. When a DFA state matches only N symbols among its transitions, this encoding may be used, and provides favorable compression, as seen by the destination state block requiring N+1 instructions.

U.S. Pat. No. 7,788,206 to McMillen et al, herein incorporated in its entirety, describes a DFA compression method wherein a linear sequence of several DFA states matching one symbol each may be represented in a single instruction. For example, a DFA matching the rule "quickbrownfox" would have a sequence of 13 states matching successive letters of the patter, i.e. state A matches 'q' and transitions to state B, which matches 'u' and transitions to state C, et seq. These states may be very compactly represented in just a few instructions, such as 3 instructions where the first encodes the symbols {'q', 'u', 'i', 'c', 'k', 'b'}, the next encodes {'r', 'o', 'w', 'n', 'f', 'o'} and the last encodes symbol 'x'. The DFA engine can easily compare successive input symbols until all match or one fails to match. This method works because such symbol sequences are common inside practical rules and DFAs.

U.S. Pat. No. 8,219,508 to McMillen et al., herein incorporated in its entirety, provides a DFA compression method involving indirection which can apply to any DFA state. Like uncompressed transition tables, a full table with one entry per possible symbol value is employed, but the entries are reduced to small indirect index values, whose bit-length is determined by the number of transitions from the DFA state. For byte symbols, if an example DFA state has 12 transitions, this index block has 256 4-bit index values, each index being a value from 0 to 11. The index block is followed by one instruction for each distinct transition from the state. In this example, assuming 64-bit instructions, the index block would occupy 16 instructions, and the transitions 12 more instructions, for 28 instructions (224 bytes) total.

In an embodiment of the invention, a method of compressing a DFA instruction is disclosed. Also, in an embodiment of the invention, an apparatus for executing instructions to perform state transitions in a DFA descent is disclosed. A compression method of the invention comprises building blocks of character classes (CCLs) and equivalence class (EC) maps. The method provides efficient representation of all types of DFA states with branching (transition counts) ranging from single to low to moderate to high. The method may represent most states in a DFA with numbers of instructions equal to or close to their numbers of transition.

One basic unit is a CCL code, which is a field of a plurality of bits which may be somewhat higher than the bits required to encode an arbitrary symbol in the alphabet. This code is used to represent a limited collection of symbol classes. One or more CCL codes may appear in various instruction formats. For the standard example of byte (8-bit) symbols, 10-bit CCL codes may be used. 10-bit codes will provide coding space for 1024 CCLs. One CCL code is assigned to represent each single symbol class. For example, 256 of the 1024 10-bit codes are used to represent single-byte classes such as [a] or [b]. Additionally, a few codes may be used to represent selected fixed codes, such as caseless letters [Aa] or [Bb], or anchor classes such as End of Stream (EOS) or End of Line (EOL). The remainder of the CCL code space is programmable. By programmable, it is meant that the codes will be able to represent CCLs selected by a compiler.

CCL codes may be assigned to match each transition CCL appearing in an NFA constructed from a ruleset. These NFA CCLs are commonly the same as the CCLs appearing explicitly in the rules themselves. It is understood that there may be a few additional CCLs due to automaton construction. In general, all transition CCLs in the DFA will not be assigned a CCL code. A DFA typically has far too many different transition CCLs than are suited to a 1024 code limit. Even an 11-bit or 12-bit code would be insufficient. In practical rulesets, the number of distinct CCLs occurring in the rules is quite limited, such as the number of symbols (256 for bytes) and a few hundred other CCLs. This is because realistic rules are written for useful purposes within a particular application. Only a limited collection of "unusual" CCLs (other than single symbol values) tend to be useful within a given ruleset. When an NFA is constructed from such rules, NFA state transitions generally use the same CCLs as appearing in the ruleset. It is understood that after optimization of the NFA, multiple transitions may merge together to form a few wider CCLs. When the NFA is transformed into a DFA by subset construction algorithms, the set of transition CCLs tends to grow dramatically. This is because each DFA state is constructed as a combination of potentially multiple NFA states. Each DFA transition CCL is constructed as an intersection of various NFA transition CCLs and their complements. For example, if three NFA state transition CCLs are [abc], [abd] and [acd], they may intersect in various ways to obtain seven DFA state transition CCLs: [abc], [abd], [ab], [acd], [ac], [ad], and [a]. While there are typically only several hundred NFA transition CCLs, there may easily be tens of thousands of DFA transition CCL for more complicated rules. For this reason, only the NFA transition CCLs are granted CCL codes in the 1024 space. DFA transition can be represented by combining multiple CCL codes (from the NFA transition CCLs) in various manners.

Figure 1:
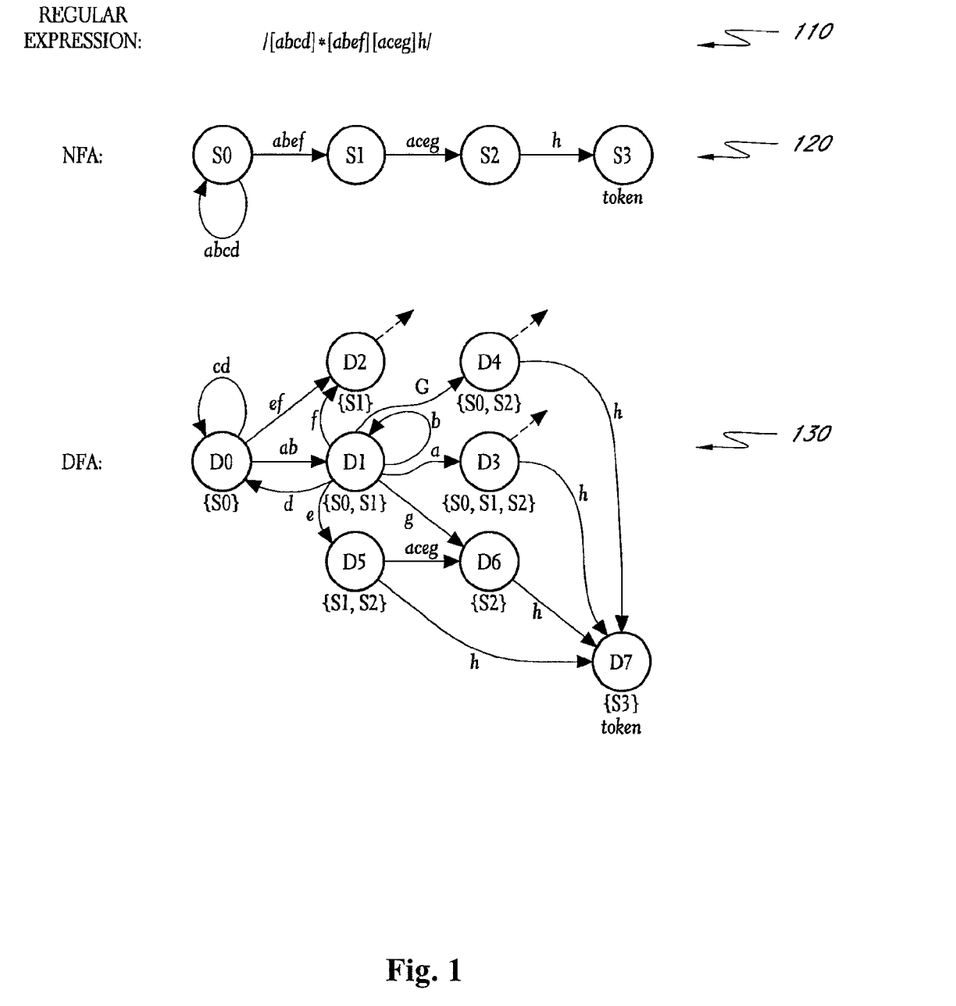
FIG. 1 illustrates a sample regular expression and corresponding NFA and DFA diagrams.

FIG. 1 illustrates a sample regular expression 110, a corresponding NFA 120 and DFA 130. In the embodiment of FIG. 1, the regular expression 110 defines search criteria that will match input data that begins with any number of characters from the character class [abcd], followed by a single character from the character class [abef], followed by a single character from the character class [aceg], followed by the character 'h'. Thus, the regular expression comprises a spin expression, e.g., [abcd]*, where the '*' indicates that any number of the preceding character class matches the constraint, that results in a DFA 130 with many more states than the corresponding NFA 120. In the embodiment of FIG. 1, the input streams comprising the characters "bach" and "bababbbbaaaaddddach", for example, would each match the regular expression, while the characters "ebach" and "back", for example, would not match the regular expression.

The exemplary NFA 120 comprises a state S0 that either loops to itself upon receiving a character from the character class [abcd] or transitions to a state S1 upon receiving a character from the character class [abef]. The multiple possible transitions from state S1 of the NFA 120 upon receiving characters 'a' or 'b' illustrate the nondeterminism of the NFA 120. From state S1, the state machine transitions to state S2 upon receiving a character from the character class [abef], and becomes inactive in response to receiving any other characters. Finally, from state S2, the state machine transitions to state S3 upon receiving the character 'h', and becomes inactive in response to receiving any other character. In one embodiment, the state S3 may be associated with an output action, such as outputting a token indicating a match of the regular expression.

The exemplary DFA 130 illustrates only a portion of the transitions in a DFA that represents the regular expression 110. As illustrated in FIG. 1, the DFA 130 comprises many additional states and state transitions when compared to the NFA 120. When the spin expression is converted to a DFA, state explosion may occur as additional states and transitions are necessary to fully match all possible input character combinations. Because a DFA includes only one possible transition for any combination of current state and input symbol, DFAs are desirable for implementation of regular expression functionality in software or hardware. However, when regular expressions comprising state explosion expressions are converted to corresponding DFAs, the size of the DFAs are very large, to the point that some regular expression functions produce DFAs that are too large to be executed on existing computing systems.

Figure 2:
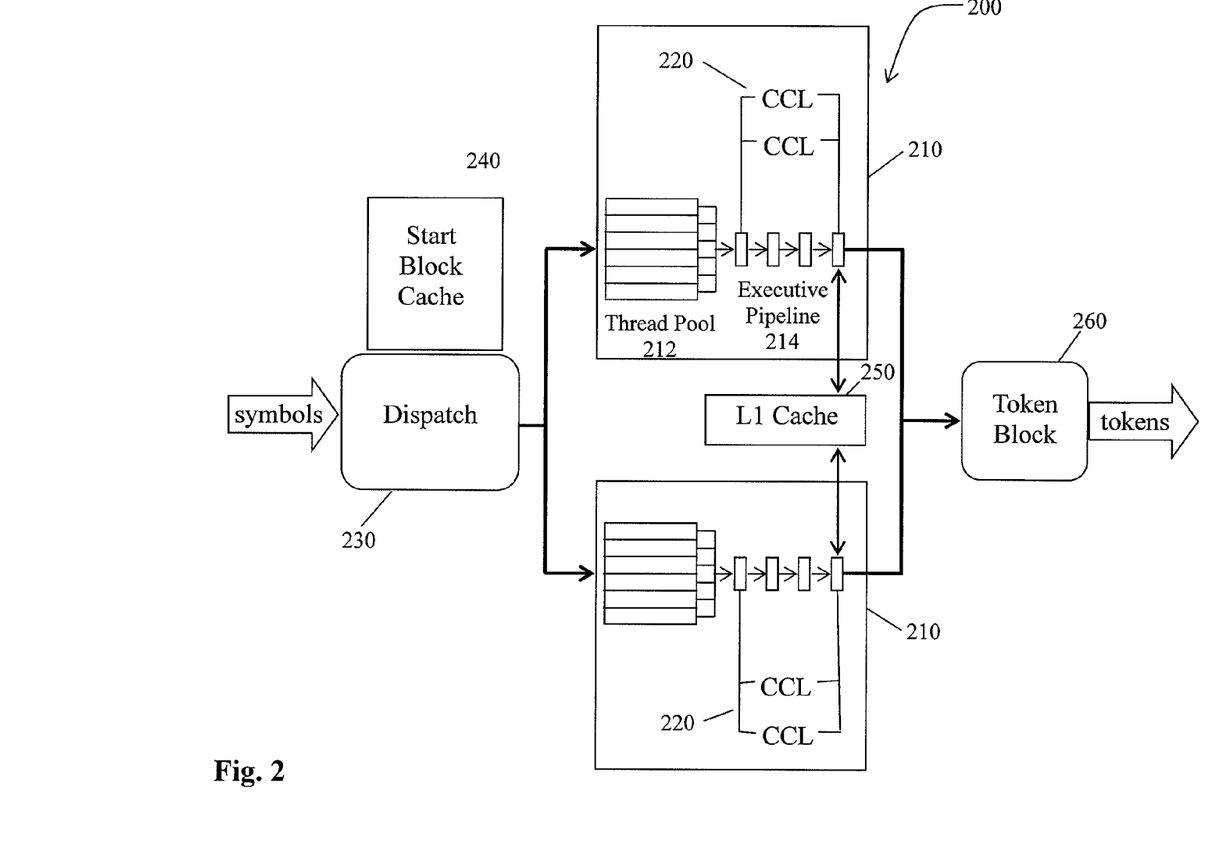
FIG. 2 is an embodiment of and execution pipeline.

FIG. 2 is an embodiment of a system of DFA for executing compressed instructions. The system 200 comprises two execution blocks 210 which contain an executive pipeline 214 and a thread pool 212. The executive pipeline 214 comprises at least one CCL memory. It is understood that there can be one or more CCL memories 212. Two such memories 214 are shown here for the point of illustration. Each execution block 210 also accesses instructions from an L1 cache 250. Symbols enter a dispatcher 230 which is enabled to access a start block cache and provide symbols to the thread pool 212. The symbols are fed through the pipeline 214 where they are compared to character classes from the CCL memories as discussed and described in this specification. Successful match results for a rule are communicated to a token block 260 where tokens are output.

Consistent with FIG. 1, in an embodiment of an apparatus of the invention to execute compressed DFA instructions, an instruction execute pipeline comprises one or more CCL memories. During instruction execution, each CCL code is extracted from the instruction and is set to be compared with an input symbol to determine if the input symbol is a member of the CCL represented by the CCL code. In the case of fixed CCL codes, single symbol CCLs or other fixed CCLs as discussed, the CCL comparison may be performed by dedicated logic and may not involve any CCL memory. For programmable CCLs, a CCL memory must be accessed to compare with the input symbol. Advantageously, all of the CCL memories can store the same CCL information so that any CCL memory can be accessed to compare any CCL code with an input symbol. If the number of programmable CCL codes appearing in an instruction is less than or equal to the number of CCL memories, then all of the instruction CCL codes may be compared with input symbols in parallel. The programmable codes will each access one arbitrarily selected CCL memory and the fixed codes will be compared without accessing any CCL memory. For example, if an instruction contains CCL codes representing the 4 symbol classes [a], [Bb] [abc] and [0-9a-f], the [a] and [Bb] fixed codes will not require memory access. The [abc] can be compared by accessing one CCL memory, while [0-9a-f] is compared by accessing a second CCL memory. If there are more programmable CCL codes in an instruction than CCL memories in the execute pipeline, then the same CCL memories will be accessed multiple times to compare all CCL codes. This may be done by passing the same instruction multiple times through the execute pipeline.

The CCL memories may be configured to read a data word with bit-width that is a power of two to several times greater than the bits to represent one symbol. For byte (8-bit) symbols, a word size may be 32 bits, enough to contain 4 symbols. Two general methods of storing selected CCLs in the CCL memory may be accordingly used. First, a "simple class" may be stored in a single CCL memory word. A simple class uses the bits of one word to represent simply described CCLs of commonly used types. Two examples are: (a) CCLs containing only a few symbols may be represented by listing the included symbols in the word; and (b) CCLs containing a range of symbols, beginning with a minimum symbol value and ending with a maximum symbol value, may be represented by encoding the minimum and maximum symbol values in the word. A few word bits may be used as an opcode to select a format, and individual flag bits can indicate, for example, that the class is negated (all symbols are accepted except the indicated ones), or that the class is case-insensitive (case variants of accepted symbols are also accepted). A simple class code is considered in the execute pipeline, the corresponding word is accessed in a CCL memory and then decoded and appropriately compared with the input symbol. This may be by testing if the input symbol matches any individually encoded symbols in the word or testing if the input symbol is between minimum and maximum symbol values in the word.

Second, a "mask class" may be stored in multiple consecutive CCL memory words spanning a number of total bits equal to the number of symbols in the symbol alphabet. In the case of byte symbols and 32-bit CCL memory words, 8 words are used to store a 256-bit mask. The mask can represent a completely arbitrary symbol class by setting the bit corresponding to each symbol to '1' if the symbol is a member of the class, or to '0' if it is not a member. Although multiple CCL memory words are consumed by one mask class, and important memory space is used in this way, only one word needs to be accessed to compare a mask class with an input symbol. A binary representation of the input symbol is split into an upper bit segment and a lower bit segment where the number of bits in CCL memory words is equal to 2 to the power of the length of the lower bit segment. Then, the upper bit segment is used to select and access one corresponding word of the mask. Then, the lower bit segment is used to select and extract one bit from the accessed mask word. The resulting bit is '1' if the input symbol is a member of the mask class, and '0' if it is not a member.

Mask classes may also use smaller numbers of CCL memory words than the number required for a full membership vector if a particular commonly used subset of the symbol alphabet is identified. Certain fixed or configurable ranges of CCL codes can refer to partial masks where, if an input symbol is within the commonly used subset, the partial mask is consulted as usual. If it is outside the subset, it is automatically considered to be a non-member, or to be a member, as configured. In the example of byte symbols and 32-bit CCL memory words, half masks may be used to represent the ASCII subset 0x00 to 0x7F, consuming 4 words for a 128-bit half mask. The CCL [amz159] (which is a random ASCII class and more than 4 symbols so that it cannot be represented as a simple class as discussed above) may be represented in such a half-mask where non-ASCII symbols are considered non-members. The CCL [^amz159] may be represented in such a half-mask where non-ASCII symbols are considered members.

It is understood that all CCLs may be represented as full mask classes so that there is no functional need for partial masks or simple class words. However, the use of partial masks and simple class words allows for the representation of CCLs in less space within a CCL memory when possible. The CCL memories may thereby be smaller and less expensive.

Using CCL codes as described herein, an instruction containing particular number ("K") of CCL codes can be used to represent a transition map from an appropriate DFA state. A maximum number K can be determined by the space available in an instruction format. This can be determined after accounting for other information that will be encoded in an instruction. For example, in 64-bit instructions with 10-bit CCL codes, a maximum of K=4 CCL codes may be encoded using 40 bits. This will leave 24 bits for other information in the instructions. This other information may include such as a destination state base address, for example. Multiple instruction formats with various numbers K of CCL codes may be provided in an instruction format. These may be such as 1, 2, 3 and 4, with smaller K-formats having more room for additional instruction information available for non-CCL code information.

One method of representing a DFA state transition map using an instruction with K CCL codes is by "priority encoding". In this method, the K CCLs have a priority order such that the highest priority matching CCL determines the transition taken. The CCL codes may be numbered CCL0, CCL1, . . . CCL(K−1). It is understood that the numbering or naming of CCL codes is arbitrary and here presented for the purpose of description. If CCL0 matches the current input symbol, transition 0 will be taken. Otherwise, if CCL1 matches the current input symbol, transition 1 is taken. This will continue through the K CCL codes. The index of the first matching CCL, from 0 to K−1, is added to a base address of the next state block. The address of the next state block is provided in the instruction. This will yield the address of the next instruction to access. If there is no match to any of the K CCLs, the DFA descent is considered to have failed to match. As described, K next instructions are accessible which represent up to K different transitions from a current state.

One method of representing a DFA state transition map using an instruction with K CCL codes uses "Venn encoding". The K CCLs are considered to represent the circles of a Venn diagram where different transitions correspond to each distinct region of the Venn diagram. In the selection process using a current input symbol from an input stream, all K CCLs are compared with the current input symbol. Each comparison yields a bit, '1' on a match (indicating a membership in a CCL) or '0' on a mismatch (indicating non-membership in a CCL). The K result bits from the comparisons are concatenated into a K-bit match vector which his interpreted as a binary number from 0 to $2^K-1$. If none of the K CCLs match, then the DFA descent will have failed to match and this will correspond to an all-zero match vector which is interpreted as a binary 0. The all-zero instance notwithstanding, the binary results will range from 1 to $2^K-1$ whereby 1 may be subtracted to yield a next instruction offset from 0 to $2^K-2$ from the base address of the next state block. As discussed, Venn encoding uses K CCLs to access $2^K-1$ next instructions which represents the same number of different transitions from a current state. Considering the number of next instructions and the binary number representations, it is understood that offsets and configuring of instructions allows for a failure instruction for a binary 0, or failed match, case.

For example, let it be assumed that K=3. For purposes of the example, the three CCLs are CCL0=[abde], CCL1=[abcf] and CCL2=[acdg]. If the current symbol is 'c', comparing against each of the CCLs will result in '0', '1', and '1', respectively. Concatenating the result bits into a vector, with CCL2 representing the highest value bit, yields "110". This is equivalent to binary 6. It is understood that the ordering of the CCLs to produce a binary value is arbitrary. It is equally possible that the CCLs could also be ordered differently. The resulting vector could be "101" or "011" and the configuration of the instruction blocks would be accordingly programmed. Subtracting 1 from out example gives 5 as an offset value for the next state block base address. The 7 letters from 'a' to 'g' in the CCLs yield 7 different match vectors from "001" which correspond to offsets from 0 to 6. Accordingly Venn encoding with these 3 CCLs represents 7 different transitions from the same DFA state. Similarly, 2 CCLs can represent up to 3 transitions and 4 CCLs can represent 15 transitions. A symbol not represented in the three CCLs above, such as 'h', would not result in a match. The resulting vector would be "000" which equals binary 0. This would equal a match failure for the DFA descent.

Subset construction algorithms may be used to construct DFA states. Each DFA state will represent a subset of the possible NFA states with each DFA state having one or more transitions with various CCLs. The constructed DFA state may transition to a different destination DFA state for each combination of corresponding NFA transition CCLs which match or mismatch a given symbol. If there are K distinct NFA transitions CCLs involved in the construction of a DFA state, there will be at most $2^K-1$ different transitions from the DFA state to various destination DFA states. These transitions are modeled by the action of Venn encoding using the K NFA transition CCLs. The transitions of a DFA state have CCLs which have various intersections of NFA CCLs and their complements, taken at compile time. Venn encoding for NFA CCLs models the same intersections at execution time. Any DFA state can be represented by Venn encoding with K NFA CCLs for some value of K. A large majority of the states of a typical DFA may be represented by Venn encoding with a value of K small enough to fit K CCL codes in a single instruction, K=4 or less for example.

It is understood that Venn encoding using a particular set of K CCL codes may not be able to access all $2^K-1$ instructions in the next state block. This results from the property of Venn diagrams that although K circles divide the space into a maximum of $2^K$ regions, they may not overlap in all combinations and may therefore divide the space into fewer regions. For example, if K=3, CCL0=[ab], CCL1=[bc] and CCL2=[cd], the input symbol 'a' generates match vector "001"=1 binary value, 'b' generates a vector of "011"=3 binary value, 'c' generates a vector of "110"=6 binary value, 'd' generates a vector of "100"=4 binary value, and other symbols generate a vector of "000"=0 binary value. This is only 4 non-failure transitions, where $2^3-1=7$ for possible Venn intersections. No symbol generates a vector of "111"=7 binary value. An instruction offset of 6, as discussed above, will never be accessed. The unreachable instruction positions in the destination state block may be called Venn holes for purposes of description. The Venn holes may be filled with null instructions, or they may be packed with instructions for unrelated state blocks. If the instruction cache has single instruction cache lines, Venn holes may not get pulled into the cache and may have no performance impact.

Venn encoding with K CCL codes offers flexibility when compared to priority encoding with the same CCL codes. Any DFA state whose transitions can be priority encoded with K CCL codes can also be Venn encoded with the same K CCL codes. Priority encoding represents K transitions from the DFA state and Venn encoding represents the same K transitions by having each of the $2^K-1$ instruction offsets accessed by Venn encoding correspond to an appropriate one of the K DFA transitions. For example, if K=2 with CCL0=[ab] and CCL1=[bcd], the priority encoding maps symbols [ab] to instruction offset 0 from the next state block base address representing a first DFA transition, and symbols [cd] are mapped to an instruction offset 1, representing a second DFA transition. For Venn encoding of the same CCLs, the various intersections yield instruction offset 0 on [a], offset 1 on [cd] and offset 2 on [b]. If the next state block instructions at offset 0 and 2 are used to execute the first DFA transition, and the instruction at offset 1 the second DFA transition, then the Venn encoding accomplishes the same transition map as the priority encoding. However, priority encoding is preferable when possible, because the destination state block can be smaller, resulting in a smaller DFA instruction image and better instruction cache performance. In essence, priority encoding is preferable when possible because it uses fewer instructions. This difference in number of instructions required occurs in the destination state block.

Priority and Venn encoding may be combined in a single instruction, such as by encoding a certain number of CCL codes for the priority method and a certain number of codes for the Venn method. For purposes of description, when combining the two encoding methodologies, KP is the number of priority codes and KV is the number of Venn encoding codes, where KV+KP=K. Any match to one of the KP CCLs may take precedence indicating next instruction access at a corresponding offset from the next state block base address. If none of the KP CCLs match, then a match vector from the KV CCLs may be used as a binary instruction offset from the next state block base address plus KP. The numbers KP and KV may be encoded in the instruction or each CCL code may be flagged as priority or Venn. By indicating Venn mode for the instruction overall, but not otherwise encoding any grouping into priority and Venn CCLs, all CCLs may be used for the Venn method, except single-symbol fixed CCL codes which may always be safely given priority treatment because they cannot partially intersect other CCLs. This treatment may be agreed on by the compiler and DFA engine, such that the DFA engine will detect single-symbol fixed CCL codes and give them priority treatment, and the compiler will structure the destination state block such that priority treatment of the single-symbol fixed CCL codes and Venn treatment of the remaining CCL codes will access the proper transition instructions. For example, if Venn mode is selected in an instruction containing CCL codes for [a], [b], [bcd] and [def], then the single-symbol classes [a] and [b] may be used in the priority method to access next instruction offsets 0 and 1. The multi-symbol classes [bcd] and [def] may be used in the Venn method to form a 2-bit match vector which is able to access next instruction offsets 2, 3 and 4. Accordingly, 4 CCL codes are used to access 5 transition instructions. By mixing priority and Venn encoding in a single instruction, the size of a state instruction block can be reduced below $2^K-1$ instructions for a pure Venn encoding.

A DFA transition map may also be represented by multiple instructions by another method which shall herein be referred to as "instruction chaining". In instruction chaining, multiple instructions with priority or with Venn encoding, or with both, are accessed in sequence. The instructions should have different CCL codes and may have different numbers of CCL codes, e.g. K1, K2, K3, etc. The first instruction in the chain will carry other state information such as destination state block base address. Accordingly, further instructions may fit a greater number of CCL codes in the instruction format. In the example used above, with 10-bit CCL codes and 64-bit instructions, K1 may have a maximum of 4 CCLs, but K2, K3, etc., may have up to 6 CCL codes encoded in the instruction. In the DFA engine, the first instruction is accessed and passes through the execute pipeline. If any of the K1 CCLs match the current symbol, the appropriate instruction offset from the next state block base address determined by priority or Venn encoding is accessed and no further instructions are accessed for this state transition. However, if none of the K1 CCLs match, the second instruction is accessed and also passes through the pipeline with no further input symbol consumed. The same current symbol is compared. The next state base address is also adjusted upwards by the number of instruction offsets reachable by the first instruction. The adjustment will be +K1 for priority encoding and $+2^{K1}-1$ for Venn encoding. If any of the K2 CCLs in the second instruction match, the appropriate instruction offset from the updated next state block base address determined by priority or Venn encoding is accessed. No further instructions are accessed for this state transition. If none of the K2 CCLs match, the process continues with the third instruction and so forth.

By utilizing instruction chaining, more complex DFA transition maps can be represented. A trade-off is that multiple instructions are used and multiple passes through the execute pipeline are required. In the case of a 10-bit CCL code and 64-bit instruction, a 2-instruction chain can use a maximum of 4+6=10 CCL codes. Up to 10 transitions can be processed using priority encoding in both instructions. Up to 15+63 transitions can be processed using Venn encoding in both instructions. This number of Venn transitions assumes that the 10 CCLs do not participate in a common Venn mapping. It is understood that the CCL codes from 2 or more instructions can be all compared with an input symbol unconditionally and used to form a larger match vector. With two instructions, $2^{10}-1=1023$ transitions in this case, which exceeds the maximum of 256 distinct transitions from a DFA state with byte symbols. Similarly, a 3-instructions chain could use a maximum of 16 CCL codes and execute up to 141 transitions by independent Venn encoding. Instruction chaining may be limited to some maximum length, such as 2 or 3 instructions, to limit performance loss from multiple pipeline passes.

The above described CCL code based methods of mapping DFA state transitions handle a great majority of states in a typical DFA for a useful application ruleset. Priority encoding handles simple states with a small number of transitions. Venn encoding handles more complex states with more transitions. Instruction chaining extends to even more complex states with many transitions. Still other states, such as those near a DFA root state, may have very many transitions and may be constructed in a very complex manner from many corresponding NFA states and transitions. Such states may be difficult to map with chained instructions unless many instructions are chained, such as 10 or 40 instructions. Such an instruction heavy configuration for transitions from a single state imposes significant performance load.

Equivalence class (EC) maps may be used to match transitions for such complex states. An EC map is a particular mapping of all the symbol values into an equal or smaller number of equivalence class values, by lookup table. Multiple EC maps are stored in the CCL memories already mentioned but will take up more space than simple classes and mask classes. In the case of byte (8-bit) symbols, EC values may also be 8-bit values. So, 256×8=2048 bits are required to store an arbitrary EC map, which is 8 times the space of a full mask class. Some stored EC maps may use fewer EC values which can be represented in fewer bits, consuming less space per EC map. In the byte-symbol case, an 8-bit EC map may be used consuming 256×8=2048 bits and also 4-bit EC maps consuming 256×4=1024 bits for EC maps with 16 EC values or fewer. If multiple CCL memories are used in an execute pipeline, different EC maps may be stored in each CCL memory, unlike simple and mask classes which may be repeated in each memory. This is because only EC map needs to be accessed at a time. This further reduces the effective resource consumption.

An EC instruction format may then be provided, which references a destination state block base address as usual. However, rather than having any CCL codes, the EC instruction format contains a reference to an EC map in an indicated CCL memory. To execute this type of instruction in the execute pipeline, the current input symbol is used to access a corresponding EC value from the referenced EC map. This may be done by using the upper bits of the current symbol value to select and access a word of the EC map in the CCL memory and the lower bits to select and extract an EC value from the word. In the byte-symbol case with 32-bit CCL memory words, to obtain an 8-bit EC value, the upper 6 bits of the current symbol are used to access one of the 64 words from the memory, and the lower 2 bits are used to extract one of 4 8-bit EC values from the word. To obtain a 4-bit EC value, the upper 5 bits of the current symbol are used to access one of 32 words from the memory and the lower 3 bits are used to extract one of 8 4-bit EC values from the word. After extracting the EC value corresponding to the current input symbol, the EC value is added to the next state block base address to obtain the address of a next instruction to access. This means the destination state block needs to have a number of instructions at least equal to the number of EC values in the referenced EC map.

If a DFA state requiring EC encoding has a number, T, transitions, then an EC map may be constructed with T values if the transition CCLs cover all possible symbols or T+1 EC values if there is some symbol not matching any transition CCL. The EC map would map each symbol value to the index of the proper transition to take and this state would be encoded using T or T+1 instructions. The instruction may have a flag indicating that EC value of 0 is the failure class. In which case, the EC map would need T+1 EC values, but the state block would only need T instructions. In this manner, states too complex for CCL-code instructions may be mapped with ideal efficiency using an EC map and execution requires only a single execute pipeline pass.

It is understood that EC maps are expensive in terms of resources and the CCL memory may have sufficient room for only a limited number of such maps, e.g. 10 to 100 maps. In a complex DFA many more states may require the use of EC maps. In such a situation, multiple client states may share the same EC map and a separate EC map may not be tailored for exact transition classes for the states. A "finer" map is chosen for each client state rather than an ideal EC map. This finer map will have more EC values than the number of transitions from each client state, such that each equivalence class of the EC map is contained within at most one transition CCL of each client state. For example, if state A has transitions on [abc] and [xyz], and state B has transitions on [cd] and [xyz], then a sharable EC map may be constructed with 5 ECs: [ab], [c], [d], [xyz] and [^abcdxyz]. States A and B would encode in 5 instructions each using the shared EC map.

The compression technique of U.S. Pat. No. 8,219,508 titled "Systems and Methods for Compressing State Machine Instructions", incorporated herein in its entirety, can be used to encode DFA states using a shared EC map which has substantially more EC values than transitions in the state. In this "EC Compression" optimization, rather than an EC value retrieved from an EC map being used to access a transition instruction directly from the next state block, the EC value is used to access an index value from an index block starting at the destination state block base address. The required size of index block is reduced by the use of an EC map because fewer EC values than total symbol values may be used to access the index block. The accessed index value is then used to access a transition instruction from a transition block following the index block.

An EC map format instruction may have a field indicating the number of bits in each index value in the index block. The input symbol is used to access the indicated EC map and obtain an EC value, which is then used along with the indicated index bit length to access an index value from an "instruction" in the index block starting at the next state block base address. Another EC compression field indicating the length of the index block is used in conjunction with the obtained index value to access a next instruction, completing the state transition by means of two instruction accesses. U.S. Pat. No. 7,788,206, titled "State Machine Compression Using Multi-Character State Transition Instructions", to McMillen et al., herein incorporated in its entirety, relates to where an instruction encodes a sequence of several symbol values to represent a corresponding linear sequence of DFA states with single transitions on single-symbol classes. Combining encoding in an instruction a sequence of several symbol values with the methodology and system discussed herein, a single instruction may represent a linear sequence of DFA states with single transitions on arbitrary symbol classes. For example, if DFA states match a rule or rule fragment "[Tt]oll [Ff]ree 1-8[07][07]-[0-9][0-9][0-9]-[0-9][0-9][0-9][0-9]", a sequence of 24 CCLs, then just four 64-bit instructions, each containing six 10-bit CCL codes can represent the 24 states and transitions. To execute such a CCL sequence instruction, the execute pipeline considers one sequence CCL code on each pass through the pipeline, comparing with and consuming the current symbol. Or, the execute pipeline could compare multiple sequence CCL codes with multiple corresponding input symbols, beginning with the current symbol in one pass through the pipeline, and consume multiple input symbols, thus achieving accelerated CCL sequence matching in addition to CCL sequence compression.

Figure 3A:
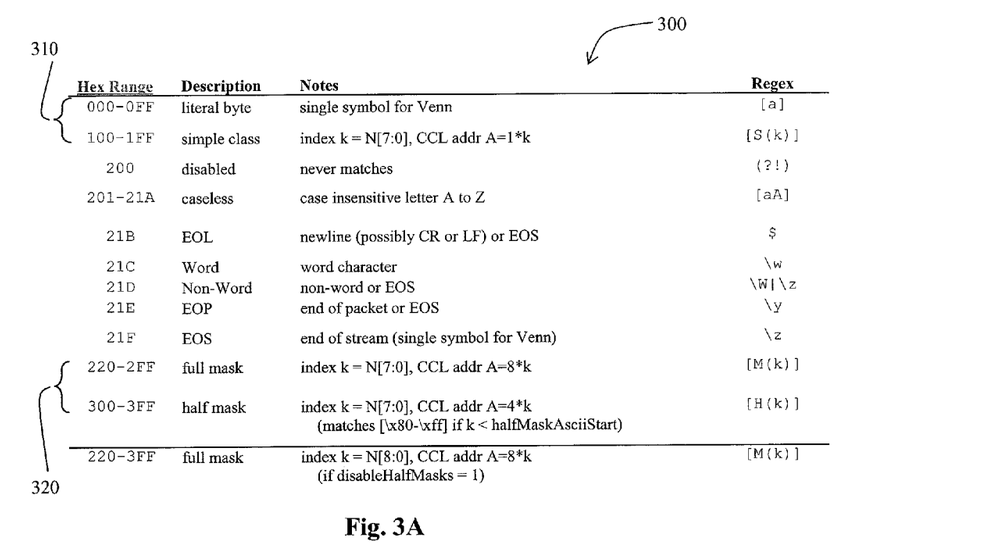
FIG. 3a is an embodiment of CCL memory addresses.
Figure 3B:
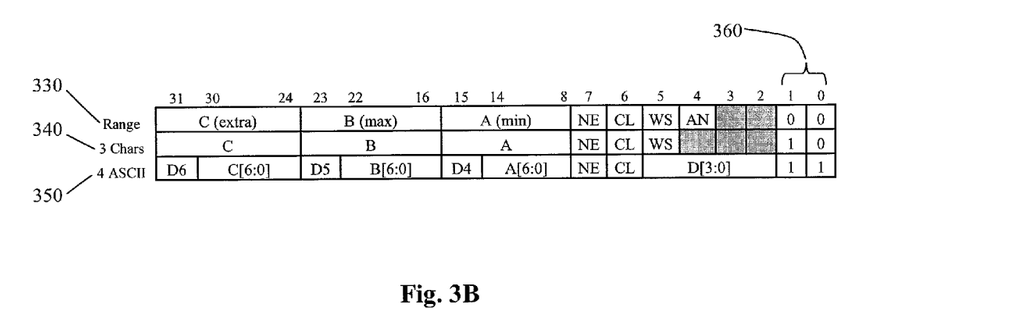
FIG. 3b is an embodiment of simple class formats.

FIG. 3a is an embodiment of mapping of 10-bit CCL codes. As noted in the description above, some of the mappings are hardwired 310, where others are programmable 320. In the embodiment shown in the figure, the CCL memory is 32 bits wide. As such, a mask class consumes 8 words. Codes 0x200-0x21F are used for disabled, caseless, and end anchors, and addressable full masks begin after a gap the size of 32 masks, or 256 words. The simple class codes 0x100-0x1FF use this space. The simple class codes may be defined as a 32-bit word as shown in FIG. 3b. There are three formats to store the simple classes. There is a range format 330, a 3 character byte value format 340 and a 4 character ASCII format 350. The two bits 360 at positions 0 and 1 may be used as opcodes for decoding which format is being used. A, B and C are 7-8 bit characters. NE indicates a negated class (class matches characters other than those indicated). CL indicates caseless. AN indicates alpha-numeric. WS indicates whitespace. Field 'C' is a mask of whitespace characters. So, if the WS flag is set, the bit values for the 'C' field may be as follows:

0: \x00 (null
1: \x08 (backspace)
2: \x09 (\t)
3: \x0a (\n)
4: \x0B (\v)
5: \x0C (\f)
6: \x0D (\r)
7: \x20 (space)

Full masks codes reference one of up to 512−32=480 arbitrary CCL masks in one of the CCL memory banks. The low 8 or 9 bits of the CCL code point to one of the 256-bit masks and the data byte 0x00-0xFF selects a single bit where '1' means the byte is a member of the CCL. Physically, 3 upper character bits combine with the CCL code to read a 32-bit word and the remaining 5 character bits extract one bit. Half mask codes reference one of up to 256 half-length CCL masks in one of the CCL memory banks. The low 8-bits of the CCL code point to one of the 128-bit masks and the ASCII data byte 0x00-0x7F selects a single bit where '1' means CCL membership.

The various encoding techniques and systems described in this disclosure provide ways to efficiently compress a full spectrum of DFA states and structures, from the simplest structure of a CCL sequence encoded in the corresponding instruction format, to simple states mapped with priority encoding, to moderately complex states mapped with Venn encoding and instruction chaining, to highly complex states mapped with EC maps and EC compression. It is understood that applicability of the described ways overlap so that choices can be made based on the needs and resources in a given application. For example, a plain EC map may be used for fast execution with one pipeline pass, or a 2-instruction chain or compressed EC map may be used to provide greater compression and cache performance.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of character class encoding and DFA (deterministic finite automaton) execution in a DFA engine wherein an instruction execute pipeline in said DFA engine comprises at least one CCL (character class) memory, the method comprising:

storing a plurality of character classes in said at least one character class memory;

representing the plurality of character classes with a plurality of character class codes, wherein at least one symbol is a member of at least two character classes;

representing, with at least a plurality of instructions, transitions of one or more DFA states, wherein each instruction comprises at least one character class code;

extracting at least two character class codes from an instruction of the plurality of instructions;

accessing said at least one character class memory to retrieve at least two accessed character classes that corresponds to the at least two character class codes;

matching a current input symbol with said at least two accessed character classes; and executing the instruction to determine a transition to a next state.

2. The method of claim 1, wherein each single symbol class is represented by a character class code.

3. The method of claim 1, wherein each of a plurality of single symbol classes is represented by a character class code and each of a plurality of fixed, multi-symbol classes is represented by a character class code.

4. The method of claim 1, wherein each of said character classes matches a transition in an NFA (nondeterministic finite automaton) constructed from a ruleset.

5. The method of claim 1, wherein each of a plurality of single symbol classes is represented by a character class code, each of a plurality of fixed, multi-symbol classes is represented by a character class code, and each of a plurality of programmable classes is represented by a character class code.

6. The method of claim 1, further comprising storing at least one equivalence class map in the character class memory and accessing a word of the equivalence class map determined by an equivalence class map reference in the instruction and an input symbol.

7. The method of claim 1, wherein the at least one character class comprises at least two character class codes and the step of executing the instruction comprises using priority encoding according to the results of said step of comparing.

8. The method of claim 7, wherein at least two instructions are used to encode the transition from a DFA state and if no character class codes in a first instruction match the current input symbol, then the character classes from a second instruction are used to determine the transition to the next state.

9. The method of claim 1, wherein the at least one character class code comprises at least two character class codes and the step of executing the instruction comprises using Venn diagram analysis according to the results of said step of comparing.

10. The method of claim 9, wherein at least two instructions are used to encode the transition from a DFA state and if no character class codes in a first instruction match the current input symbol, then the character classes from a second instruction are used to determine the transition to the next state.

11. The method of claim 1, wherein the at least one character class comprises at least two character class codes and the step of executing the instruction comprises using priority encoding and Venn diagram analysis according to the results of said step of comparing.

12. The method of claim 7, wherein at least two instructions are used to encode the transition from a DFA state and if no character class codes in a first instruction match the current input symbol, then the character classes from a second instruction are used to determine the transition to the next state.

13. The method of claim 5, wherein the programmable classes are mask classes stored in multiple consecutive CCL memory words.

14. A system for character class encoding and DFA (deterministic finite automaton) execution in a DFA engine, comprising:

a compiler enabled to represent, with at least a plurality of instructions, transitions of one or more DFA states, wherein each instruction comprises at least one character class code; and an instruction execute pipeline, said pipeline comprising at least one CCL (character class) memory, wherein at least one symbol is a member of at least two character classes;

wherein said pipeline is enabled to extract character class codes from the plurality of instructions and access at least two corresponding character classes from said at least one CCL memory, and match an input symbol with the at least two accessed character classes and to execute a DFA transition based on the determination of character class representation.

15. The system of claim 14, wherein the character class codes comprise fixed codes and programmable codes.

16. The system of claim 14, wherein the character class codes comprise fixed codes and programmable codes and wherein the pipeline is further enabled to compare character classes corresponding to fixed classes by dedicated logic without accessing one of the plurality of CCL memories.

17. The system of claim 14, wherein the pipeline executes the instruction using at least one of priority encoding and a Venn diagram.

18. A system for character class encoding and DFA (deterministic finite automaton) execution in a DFA engine, comprising:

a compiler enabled to represent, with at least a plurality of instructions, transitions of one or more DFA states, wherein each instruction comprises at least one character class code; and an instruction execute pipeline, said pipeline comprising at least one CCL (character class) memory, wherein at least one symbol is a member of at least two character classes;

wherein at least one equivalence class map is stored in said at least one CCL memory and said pipeline is enabled to access a word of said equivalence class map, said word being determined by an equivalence class map reference in an instruction and an input symbol.

19. One or more non-transitory, machine-readable storage media comprising a plurality of instructions stored thereon that in response to being executed cause a computing device to:

store a plurality of character classes in at least one character class memory;

represent the plurality of character classes with a plurality of character class codes, wherein at least one symbol is a member of at least two character classes;

represent, with at least a plurality of instructions, transitions of a DFA, wherein each instruction comprises at least one character class code;

extract at least two character class codes from an instruction of the plurality of instructions;

access said at least one character class memory to retrieve at least two accessed character classes that corresponds to the at least two character class codes;

match a current input symbol with said at least two accessed character classes; and execute the instruction to determine a transition to a next state.

20. The one or more non-transitory, machine-readable media of claim 19, wherein the instructions further cause the computing device to store at least one equivalence class map in the character class memory and access a word of the equivalence class map determined by an equivalence class map reference in the instruction and an input symbol.

\* \* \* \* \*